United States Patent
Ip et al.

(10) Patent No.: US 11,543,287 B2
(45) Date of Patent: Jan. 3, 2023

(54) DISTRIBUTED ACOUSTIC SENSING USING MULTI-BAND TIME-GATED DIGITAL ORTHOGONAL FREQUENCY DOMAIN REFLECTOMETRY

(71) Applicant: NEC Laboratories America, Inc., Princeton, NJ (US)

(72) Inventors: Ezra Ip, West Windsor, NJ (US); Yue-Kai Huang, Princeton, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/324,089

(22) Filed: May 18, 2021

(65) Prior Publication Data

US 2021/0364345 A1   Nov. 25, 2021

Related U.S. Application Data (60) Provisional application No. 63/027,527, filed on May 20, 2020.

(51) Int. Cl.
*G01H 9/00* (2006.01)
(52) U.S. Cl.
CPC ................................ *G01H 9/004* (2013.01)
(58) Field of Classification Search
None
See application file for complete search history.

(56) References Cited

U.S. PATENT DOCUMENTS

| | | | |
|---|---|---|---|
| 2012/0280117 A1* | 11/2012 | Lewis | G01D 5/35329 385/12 |
| 2015/0345324 A1* | 12/2015 | Spiegelberg | G01M 15/02 415/118 |
| 2018/0058982 A1* | 3/2018 | Hartog | G01H 9/004 |
| 2018/0267201 A1* | 9/2018 | Lewis | B61L 1/166 |
| 2019/0383648 A1* | 12/2019 | Austin | G01D 5/35303 |
| 2020/0048999 A1* | 2/2020 | Langnes | G01N 29/4427 |
| 2020/0116556 A1* | 4/2020 | Cedilnik | G01K 11/32 |

* cited by examiner

*Primary Examiner* — Brandi N Hopkins
*Assistant Examiner* — Nigel H Plumb
(74) *Attorney, Agent, or Firm* — Joseph Kolodka (57) ABSTRACT

Systems, methods, and structures that provide distributed acoustic sensing using chirped optical pulses of selectable duration and bandwidth, at a frame rate limited by a round-trip propagation time of a fiber under test. Instead of processing a transmitted chirped pulse as a single sequence—our systems, methods, and structures employ a parallel fragmented multiband architecture, where each tributary correlates the received signal with a truncated chirped pulse to obtain the Rayleigh impulse response over its frequency band. By reducing the duration of the chirp processed by each tributary, spatial leakage is reduced at all the tributaries, thus even after combining all the interferometric products from all tributaries using a rotated vector sum, the resultant signal is much less impacted by spatial leakage than by using a conventional TGD-OFDR method.

9 Claims, 11 Drawing Sheets

DISTRIBUTED ACOUSTIC SENSING USING MULTI-BAND TIME-GATED DIGITAL ORTHOGONAL FREQUENCY DOMAIN REFLECTOMETRY

CROSS REFERENCE

This disclosure claims the benefit of U.S. Provisional Patent Application Ser. No. 63/027,527 filed May 20, 2020 the entire contents of which is incorporated by reference as if set forth at length herein.

TECHNICAL FIELD

This disclosure relates generally to distributed fiber optic sensing (DFOS). More particularly it pertains to DFOS/distributed acoustic sensing (DAS) systems, methods, and structures employing multi-band time-gated digital orthogonal frequency domain reflectometry.

BACKGROUND

As is known in the art, time-gated digital optical frequency-domain reflectometry (TGD-OFDR) is a coding technique that can be used to increase signal-to-noise ratio (SNR) in distributed acoustic sensing systems and methods by signal correlation. Given the importance of DAS systems and methods in a great number of important contemporary industrial and societal applications, improvements to such systems and methods would represent a welcome addition to the art.

SUMMARY

An advance in the art is made according to aspects of the present disclosure directed to systems, methods, and structures for distributed acoustic sensing distributed acoustic sensing employing multi-band time-gated digital orthogonal frequency domain reflectometry.

In sharp contrast to the prior art, systems, methods, and structures according to aspects of the present disclosure provide distributed acoustic sensing use chirped optical pulses of selectable duration and bandwidth, at a frame rate limited by a round-trip propagation time of a fiber under test. And, instead of processing a transmitted chirped pulse as a single sequence—our inventive systems, methods, and structures employ a parallel fragmented multiband architecture, where each tributary correlates the received signal with a truncated chirped pulse to obtain the Rayleigh impulse response over its frequency band. By reducing the duration of the chirp processed by each tributary, spatial leakage is reduced at all the tributaries, thus even after combining all the interferometric products from all tributaries using a rotated vector sum, the resultant signal is much less impacted by spatial leakage than by using the conventional TGD-OFDR method.

Of further advantage, our digital signal processing (DSP) architecture is also quite flexible, as the number of fragmented tributaries used at the receiver is independent of the chirped pulse generator—i.e., the generator can always transmit the same signal, and the receiver determines how to process Rayleigh backscatter considering a trade-off between good spatial resolution and low spatial leakage.

BRIEF DESCRIPTION OF THE DRAWING

A more complete understanding of the present disclosure may be realized by reference to the accompanying drawing in which:

FIG. 3(A) and FIG. 3(B) are plots showing DAS results obtained in TGD-OFDR experiments showing the impact of spatial leakage in which.

FIG. 4(A) and FIG. 4(B) are schematic illustrations showing the partitioning of a long chirp sequence of duration $T_c$ and bandwidth $\alpha T_c$ into $N_b$ shorter chirp sequences, each of duration $\alpha T_c/N_b$ and duration $T_c/N_b$ wherein

FIG. 5(A) and FIG. 5(B) are plots showing instantaneous frequency profile f(t) for: FIG. 5(A) TGD-OFDR frame; and FIG. 5(B) MB-DF-OFDR frame according to aspects of the present disclosure;

FIG. 7(A) and FIG. 7(B) are plots showing DAS output obtained in a five-band MP-DF-OFDR experiment, showing improvement over TGD-OFDR wherein.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background we begin by noting that distributed fiber optic sensing (DFOS) is an important and widely used technology to detect environmental conditions such as temperature (distributed temperature sensing—DTS), vibration (distributed vibration sensing—DVS), stretch level etc. anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect—for example—vibrations occurring at one or more points along the length of the fiber.

Those skilled in the art will understand and appreciate that time-gated digital optical frequency-domain reflectometry (TGD-OFDR) is one of coding technique that can be used to increase signal-to-noise ratio (SNR) in distributed acoustic sensing (DAS) by signal correlation. By interrogating an optical fiber-under-test (FUT) with chirped pulses:

$$x(t) = \sqrt{P} \exp\left(j2\pi\alpha\frac{t^2}{2}\right) rect\left(\frac{t}{T_c}\right) \quad (1)$$

where $T_c$ is the chirp duration, $\alpha$ is the chirp rate, and $\sqrt{P}$ is the amplitude of the envelope, the total energy launched into the fiber per interrogation is $\varepsilon = P \cdot T_c$, while bandwidth of the interrogation signal x(t) is $B_W = \alpha T_c$.

Compared with optical time-domain reflectometry (OTDR) at the same peak power (which is limited by fiber nonlinearity) and bandwidth, but which uses pulses $$p(t) = \sqrt{P} \, rect\left(\frac{t}{T}\right)$$

of duration T and bandwidth $B_W = 1/T$, the energy of the interrogation signal in TGD-OFDR is $$\frac{T_c}{T} = \frac{1}{\alpha T^2}$$

times higher than OTDR. Hence, the power of the received Rayleigh backscatter and SNR also scales accordingly as $T_c = 1/\alpha T$.

Figure 1:
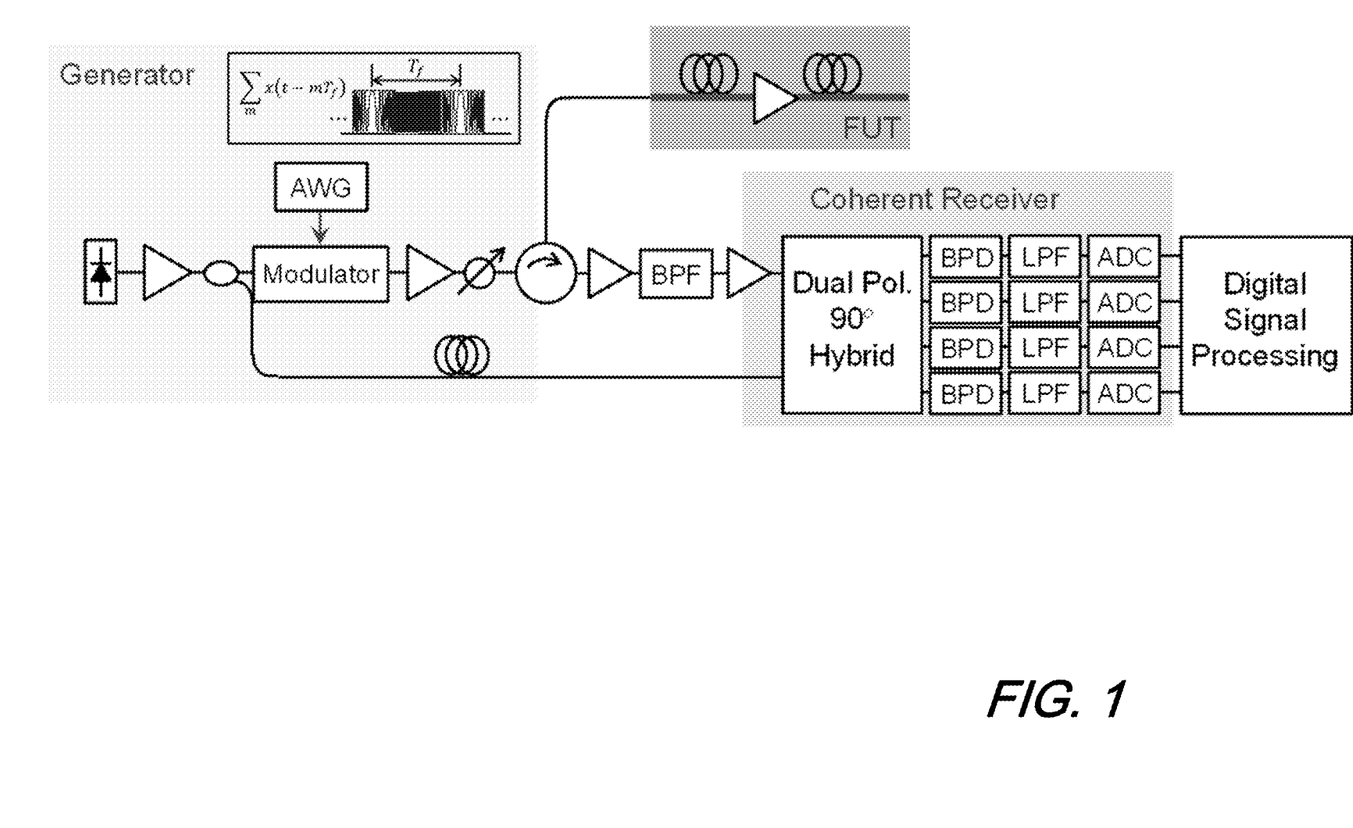
FIG. 1 shows a schematic diagram of an illustrative architectural arrangement of a correlation-based DAS interrogator including a generator that launches chirped pulses into a fiber under test (FUT), and detects by a coherent receiver Rayleigh backscatter, according to aspects of the present disclosure.

FIG. 1 shows a schematic diagram of an illustrative architectural arrangement of a correlation-based DAS interrogator including a generator that launches chirped pulses into a fiber under test (FUT), and detects by a coherent receiver Rayleigh backscatter, according to aspects of the present disclosure.

Consider the canonical architecture of a correlation-based DAS shown in FIG. 1 where a dual-polarization coherent receiver is used to detect the Rayleigh backscatter. When TGD-OFDR is applied in the absence of any phase modulation by laser phase noise or mechanical vibration of the FUT, received signal is:

$$y(t) = \int_0^L h(z)x\left(t - \frac{2z}{v_g}\right)dz + n(t) \quad (2)$$

where $h(z) = [h_x(z) \; h_y(z)]^T$ is the Jones' vector for the Rayleigh impulse response, n(t) is the equivalent additive white Gaussian noise (AWGN) added by the receiver and by any inline amplifiers along the FUT, and $v_g$ the group velocity of the fiber at the wavelength $\lambda$ of the sensing channel. By letting $t' = 2z/v_g$, Eq. (2) may be recast as a linear convolution:

$$y(t) = \int_0^{T_L} g(t')x(t-t')dt' = g(t) \otimes x(t) + n(t) \quad (3)$$

where $$g(t) = \frac{v_g}{2} h\left(\frac{v_g}{2}t\right)$$

is the Rayleigh impulse response in time-domain, and $T_L = 2n_{eff}L/c$ is the round-trip propagation time of the FUT.

The Rayleigh impulse response may be estimated by correlating the y(t) with the complex conjugate of the TGD-OFDR signal:

$$\hat{g}(t) = x^*(t) * y(t) = x^*(-t) \otimes y(t). \quad (4)$$

This operation relies on the good autocorrelation property of chirped pulses:

$$R_{xx}(t) = x^*(t) * x(t) = (T_c - |t|) sinc(\alpha t(T_c - |t|)), \quad (5)$$

For long chirps $T_c \gg T$, Eq. (5) has a main lobe with duration $T = 1/\alpha T_c$, which is the same width as the rectangular pulse used in OTDR. We have:

$$R_{xx}(t) \approx T_c sinc\left(\frac{t}{T}\right), \quad (6)$$

The correlation output of Eq. (3) is thus approximately equal to the time-domain Rayleigh impulse response g(t)

filtered between frequencies ±½T, multiplied by a gain of $T_c$. Thus, it appears as if the SNR performance of TGD-OFDR can be improved linearly without limit by increasing the chirp duration $T_c$, due to increased energy launched into the FUT.

In practice, however, the use of very long chirp duration is susceptible to distortion by phase modulation on both the outbound interrogation signal as well as the inbound Rayleigh backscatter. Consider first the impact of vibration of the FUT on outbound signal.

Let $\epsilon(z; t)$ denote the longitudinal fiber strain at position z and time t. When the outbound signal reaches z, it is given by:

$$x_z(t) = x\left(t - \frac{z}{v_g}\right)\exp\left(-jk\int_0^z \epsilon\left(z'; t - \frac{z}{v_g} + \frac{z'}{v_g}\right)dz'\right) \quad (7)$$

where $k=2\pi n_{eff}/\lambda$ is the propagation constant, and $n_{eff}$ is the fiber's effective index of refraction at the wavelength of the sensing channel.

We observe that the original signal x(t) has been phase-modulated by accumulated longitudinal strain. The Rayleigh reflection of amplitude h(z) at position z will contribute a reflected signal of:

$$y_z(t) = \left\{h(z) \cdot x_z\left(t - \frac{z}{v_g}\right)\right\}\exp\left(-jk\int_0^z \epsilon\left(z'; t - \frac{z'}{v_g}\right)dz'\right) = \quad (8)$$

$$\left\{h(z) \cdot \left[x\left(t - \frac{2z}{v_g}\right)\exp\left(-jk\int_0^z \epsilon\left(z'; t - \frac{2z}{v_g} + \frac{z'}{v_g}\right)dz'\right)\right]\right\}$$

$$\exp\left(-jk\int_0^z \epsilon\left(z'; t - \frac{z'}{v_g}\right)dz'\right).$$

The total received signal (ignoring noise contributions) can be found by summing all the infinitesimal reflections $y_z(t)$:

$$y(t) = \quad (9)$$

$$\int_0^L y_z(t)dz = \int_0^{T_L} g(t') \cdot \left[x(t-t')\exp\left(-jk\int_0^{\frac{v_g t'}{2}} \epsilon\left(z'; t - t' + \frac{z'}{v_g}\right)dz'\right)\right]$$

$$\exp\left(-jk\int_0^{\frac{v_g t'}{2}} \epsilon\left(z'; t - \frac{z'}{v_g}\right)dz'\right)dt'$$

Compared with the simple convolution in Eq. (3), the received signal in Eq. (9) is distorted by two phase modulations on the both the outbound signal and the inbound Rayleigh backscatter due to time-varying longitudinal strain. The result is that correlation by x*(t) in Eq. (3) will produce a distorted $\hat{g}(t)$, as the sinc(·) autocorrelation property of in Eq. (6) no longer holds.

The impact of phase distortion on DAS is "spatial leakage," where vibration at $z_v$ will leak to fiber positions $z>z_v$.

Figure 2:
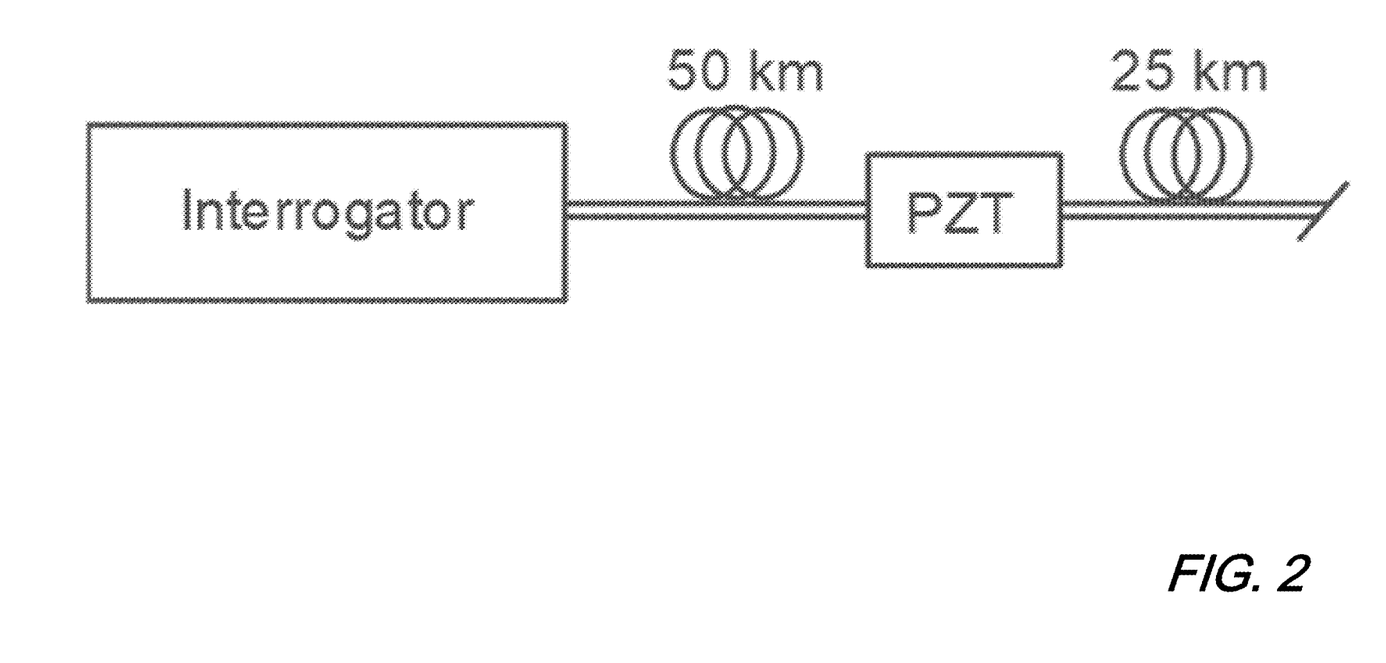
FIG. 2 shows a schematic diagram of an illustrative experimental setup to demonstrate spatial leakage in a correlation-based DAS using different correlation codes wherein a piezoelectric transducer (PZT) is interposed between a 50 km and 25 km spool of single mode fiber, according to aspects of the present disclosure.

FIG. 2 shows a schematic diagram of an illustrative experimental setup to demonstrate spatial leakage in a correlation-based DAS using different correlation codes wherein a piezoelectric transducer (PZT) is interposed between a 50 km and 25 km spool of single mode fiber, according to aspects of the present disclosure.

We illustrate spatial leakage with an example from a DAS experiment conducted on a FUT where a piezoelectric transducer (PZT) is inserted between two spools of 50-km and 25-km standard single-mode fiber (SSFM) as shown in that FIG. 2. The experiment used a chirped pulse of duration of $T_c$=50 μs and a chirp width 1/T=10 MHz (spatial resolution $\Delta z=(c/2n_{eff})T\approx 10$ m).

The PZT includes of 12 m of fiber wound on a piezoelectric ring, and has a slope of 0.8 rad/V. In this experiment, the PZT was driven with a sine wave of 10 V amplitude (phase amplitude $\Phi_0\approx 8$ rad) at a frequency of $f_{vib}$=110 Hz. The DAS interrogator launched chirped pulses at a frame rate of 1,000 Hz.

Figure 3A:
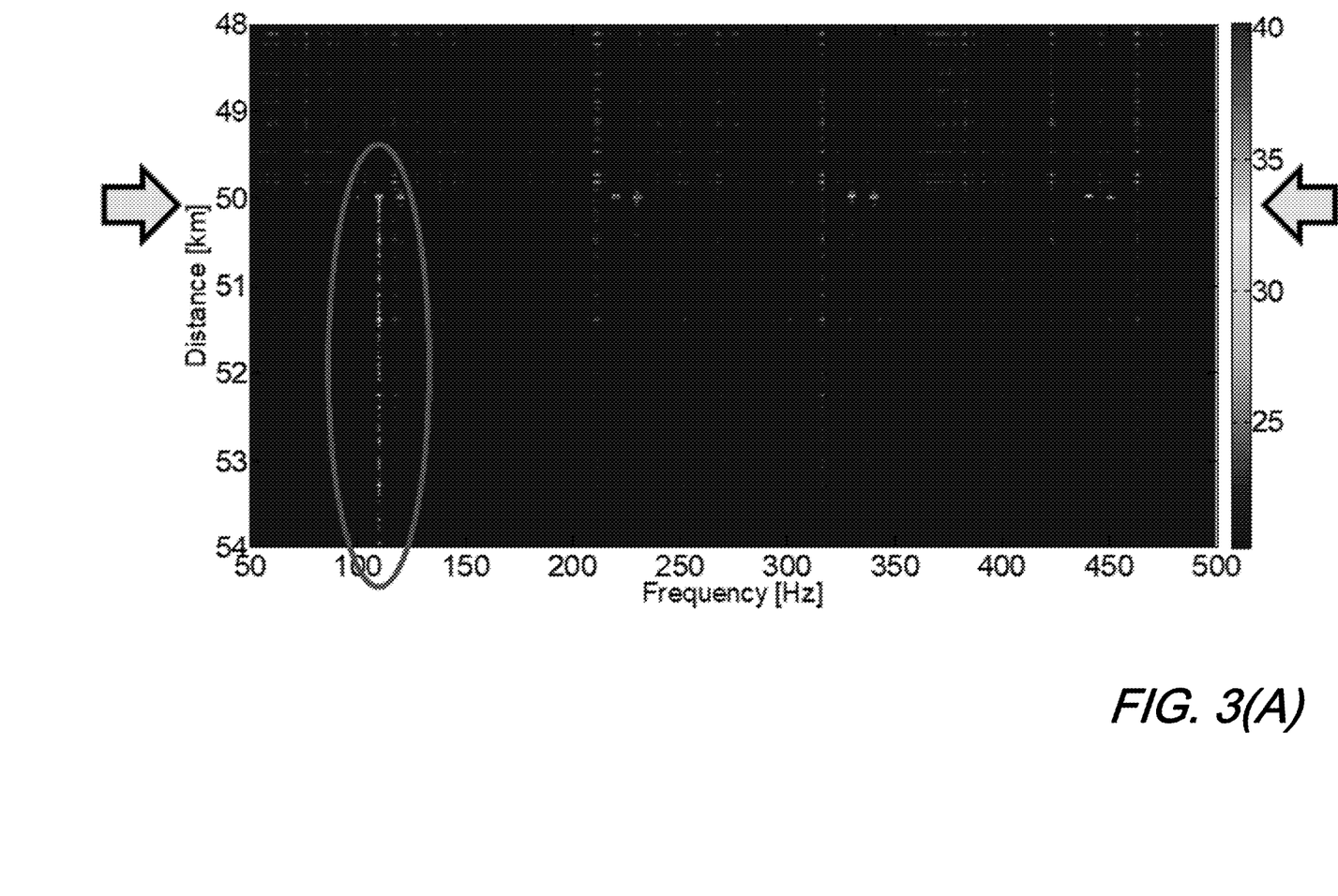
FIG. 3(A) shows measured vibration spectrum versus distance.

FIG. 3(A) shows a frequency spectrum vs distance plot for the differential beat product $\sim \hat{g}(t)\hat{g}*(t-\Delta t_g)$ where a gauge length of $\Delta z_g=(v_g/2)\Delta t_g=20$ m was used. Since the DAS samples distributed vibration at a frame rate of $1/T_f$=1,000 Hz, higher-order harmonics of $\exp(j\Phi_0 \cos(2\pi f_{vib}t+\theta))$ are aliased around the Nyquist frequency of $½T_f$=500 Hz. It is observed that the 110 Hz vibration is not merely confined to the location of the PZT (z=50 km), but leaks to all fiber positions after the PZT.

Figure 3B:
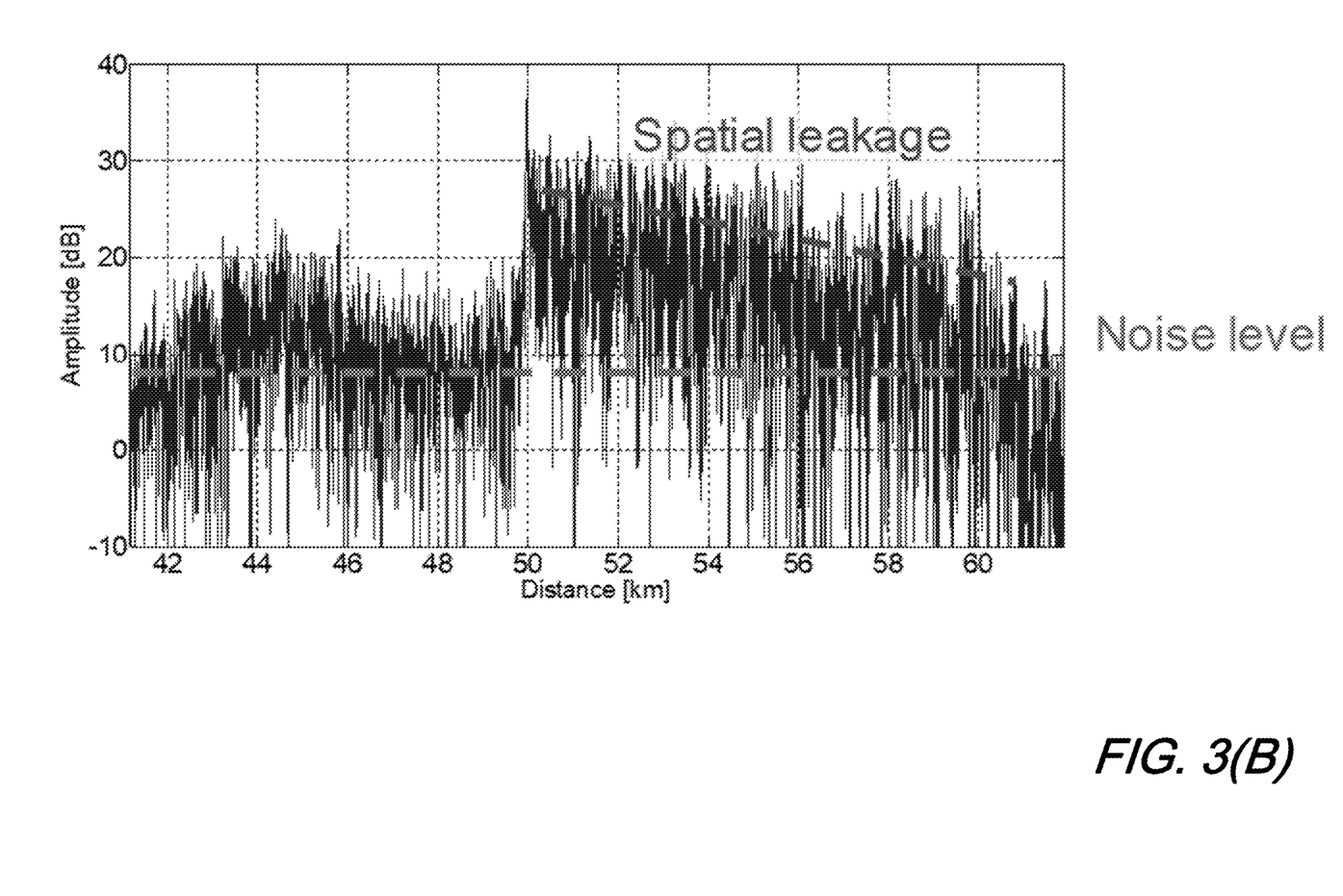
FIG. 3(B) shows vibration power vs distance at 110 Hz, according to aspects of the present disclosure.

FIG. 3(B) shows amplitude vs distance along the 110 Hz line. The long tail after the PZT is fictitious, and is due to the vibration-induced phase modulation terms in Eq. (9).

We note that the deleterious effect of multiplicative phase noise interacting with convolution by a linear impulse response is analogous to the phenomenon of equalization-enhanced phase noise (EEPN) previously observed in telecommunications. In EEPN, the multiplicative phase noise is that of the local oscillator laser, while the linear operator is the inverse chromatic dispersion (CD) of the fiber channel. It is known that the longer the duration of the CD, the more severe the impact of EEPN.

In Eq. (9) for phase distortion in TGD-OFDR, the variable to be detected is g(t') while the multiplicative phase noise is over x(t). Nevertheless, the same reasoning applies that the longer the duration of x(t), the worse the phase distortion. This appears to place a limit on the longest usable chirp duration $T_c$—vibration-induced phase distortion favors the use of shorter chirp durations.

Reducing the impact of spatial leakage in DAS caused by vibration-induced phase modulation on long chirped pulses using a multiband digitally fragmented signal processing architecture. By truncating the transmitted chirped pulse into a series of shorter pulses and processing them as distinct frequency channels, spatial leakage is reduced at the expense of reduced spatial resolution. However, we also propose that spatial resolution can be restored by chirping faster and using a wider bandwidth receiver.

One particularly distinguishing aspect of systems, methods, and structures according to aspects of the present disclosure includes our innovative digital signal processing architecture, where instead of processing a transmitted chirped pulse as a single sequence, we use a parallel fragmented multiband architecture, where each tributary correlates the received signal with a truncated chirped pulse to obtain the Rayleigh impulse response over its frequency band. Advantageously, by reducing the duration of the chirp processed by each tributary, spatial leakage is reduced at all the tributaries, thus even after combining all the interferometric products from all tributaries using a rotated vector sum, the resultant signal is much less impacted by spatial leakage than by using a conventional, prior art TGD-OFDR method.

Of further advantage, our DSP architecture is also quite flexible, as the number of fragmented tributaries to use at the receiver is independent of the chirped pulse generator—i.e., the generator can always transmit the same signal, it is up to the receiver how to process the Rayleigh backscatter output to trade-off between good spatial resolution and low spatial leakage.

To mitigate against vibration-induced phase distortion on long chirped pulses, the multiband digitally fragmented OFDR (MB-DF-OFDR) we proposed will employ a digital signal processing architecture which partitions the chirped sequence x(t) into a concatenation of $N_b$ shorter chirp sequences $x_b(t)$, where:

$$x_b(t) = \sqrt{P} \exp\left(j2\pi\alpha\frac{t^2}{2}\right) rect\left(\frac{t-\tau_b}{T_c/N_b}\right), \text{ for } b = 1, \ldots, N_b. \quad (10)$$

Figure 4A:
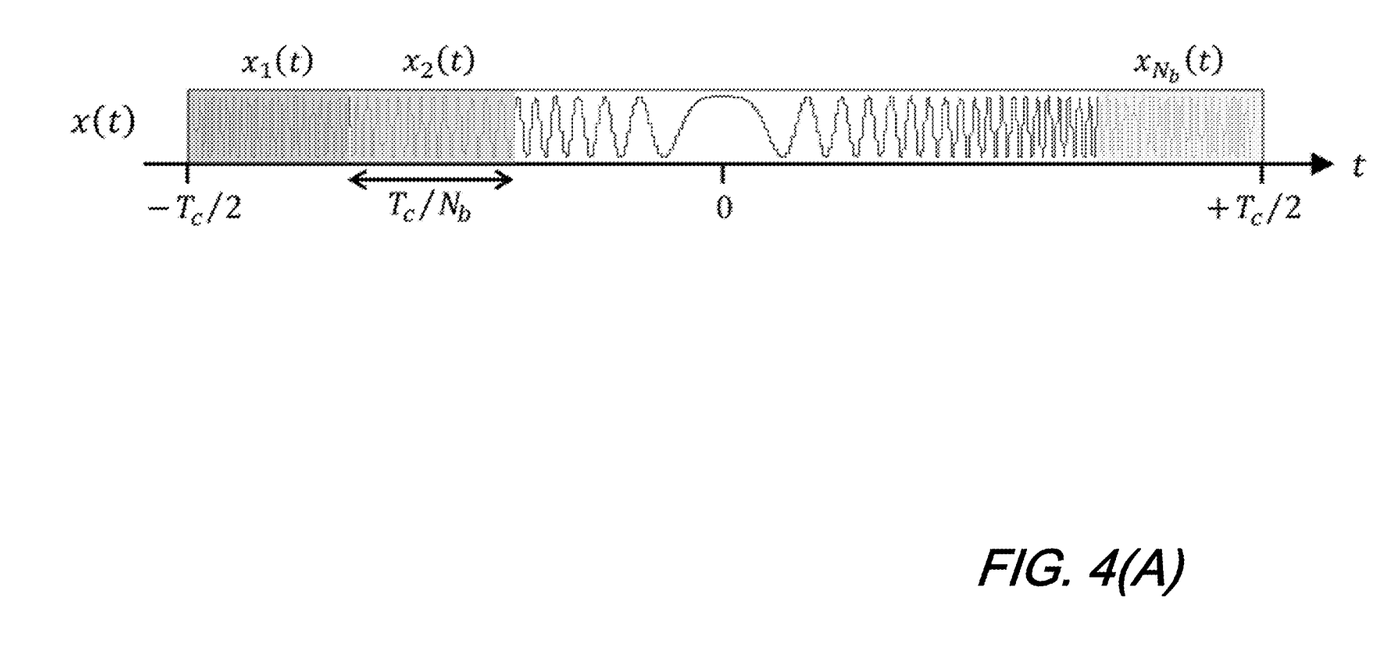
FIG. 4(A) shows a time-domain representation of a real part of $x(t)=\sqrt{P}\exp(j2\pi\alpha(t^2/2))$ for $-T_c/2 \le t < +T_c/2$.
Figure 4B:
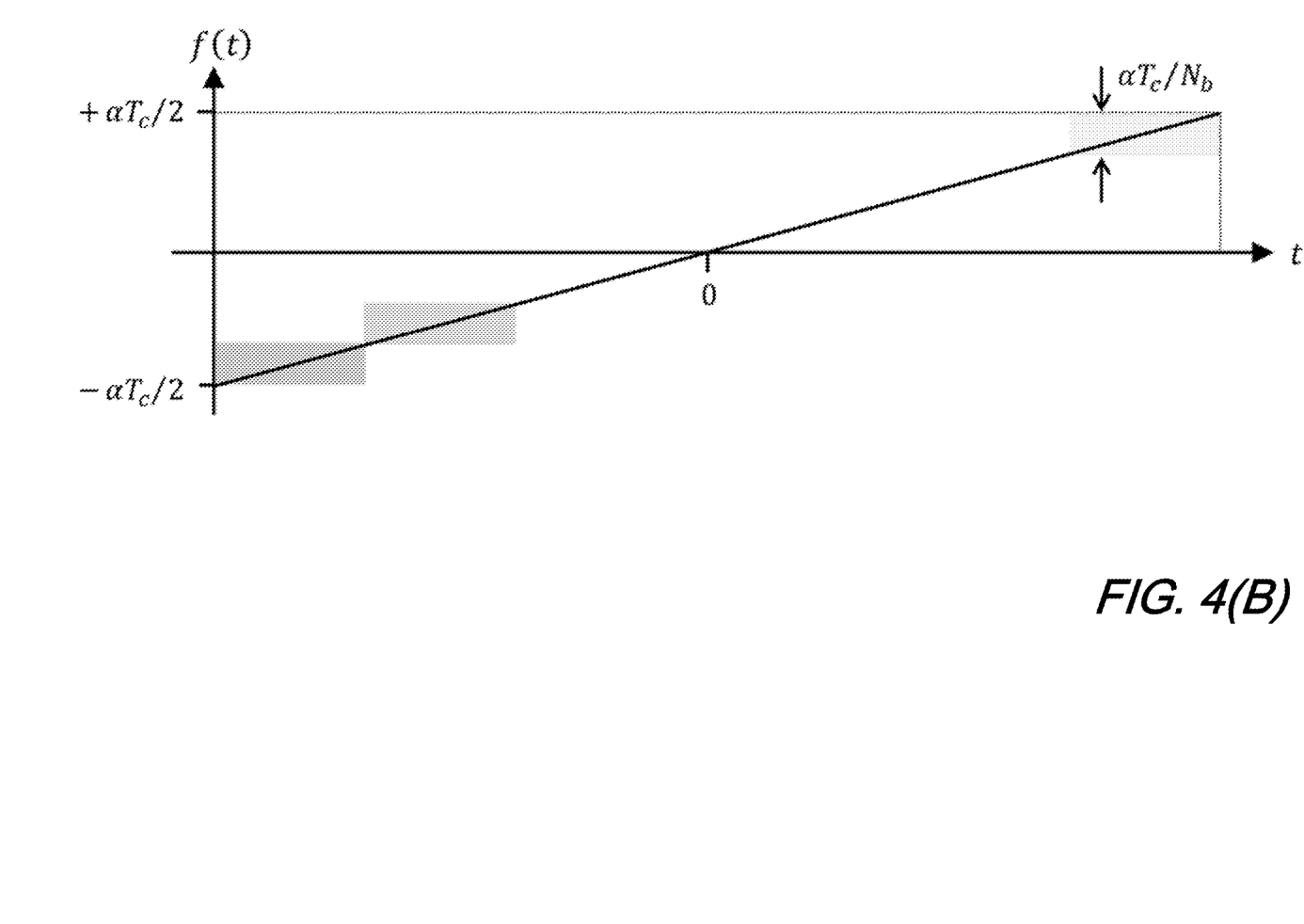
FIG. 4(B) shows an instantaneous frequency of $x(t)$, i.e., $f(t)=\alpha t$ for $-T_c/2 \le t < +T_c/2$.

FIG. 4(A) and FIG. 4(B) are schematic illustrations showing the partitioning of a long chirp sequence of duration $T_c$ and bandwidth $\alpha T_c$ into $N_b$ shorter chirp sequences, each of duration $\alpha T_c/N_b$ and duration $T_c/N_b$ wherein FIG. 4(A) shows a time-domain representation of a real part of $x(t)=\sqrt{P}\exp(j2\pi\alpha(t^2/2))$ for $-T_c/2 \leq t < +T_c/2$, and FIG. 4(B) shows an instantaneous frequency of x(t), i.e., $f(t)=\alpha t$ for $-T_c/2 \leq t < +T_c/2$.

With respect to this figure, we note that each $x_b(t)$ has duration $T_c/N_b$ and is centered around delay $\tau_b=-T_c/2+(2b-1)(T_c/2N_b)$, and occupies frequency band $$-\frac{\alpha T_c}{2} + (b-1)\frac{\alpha T_c}{N_b} \leq f_b \leq -\frac{\alpha T_c}{2} + b\frac{\alpha T_c}{N_b},$$

with $\bar{f}_b=\alpha\tau_b$ being the center of each band. The $x_b(t)$ are also merely frequency-shifted and delayed copies of the same truncated chirped pulse:

$$x_{tr}(t) = \sqrt{P} \exp\left(j2\pi\alpha\frac{t^2}{2}\right) rect\left(\frac{t}{T_c/N_b}\right) \quad (11)$$

$$x_b(t) = x_{tr}(t-\tau_b)\exp(j(2\pi f_b t + \theta_b)) \quad (12)$$

Thus, it is possible to recover the Rayleigh impulse response $\hat{g}_b(t)=[\hat{g}_{b,x}(t)\ \hat{g}_{b,y}(t)]^T$ for each frequency band $f_b$ by first frequency shifting the received signal y(t) by $-f_b$, then correlating with $x_{tr}(t)$, followed by undoing the delay $\tau_b$.

Interferometric products between different polarization combinations (k, l)$\in\{x, y\}$ of $\hat{g}_b$ (t) are then computed at a gauge length of $\Delta t_g$:

$$\zeta_{b,kl}(t)=\hat{g}_{b,k}(t+\Delta t_g)\hat{g}_{b,l}^*(t) \quad (13)$$

These $4N_b$ interferometric product terms $\zeta_{b,kl}(t)$ can then be optimally combined using a rotated vector sum to obtain $\zeta(t)$. The unwrapped angle $\angle\zeta(t)$ is proportional to the cumulative strain between fiber positions $z=(v_g/2)t$ and $z+\Delta z_g=(v_g/2)(t+\Delta t_g)$.

Preserving Spatial Resolution

A drawback of partitioning x(t) into $N_b$ shorter chirp sequences is that each $\hat{g}_b(t)$ will have bandwidth $\alpha T_c/N_b=1/N_bT$, thus the spatial resolution of the resulting DAS is likewise reduced by a factor of $N_b$ from the original $(c/2n_{eff})$ T to $(c/2n_{eff})N_b$T. Depending on the application, this loss of spatial resolution may or may not be desirable.

Figure 5A:
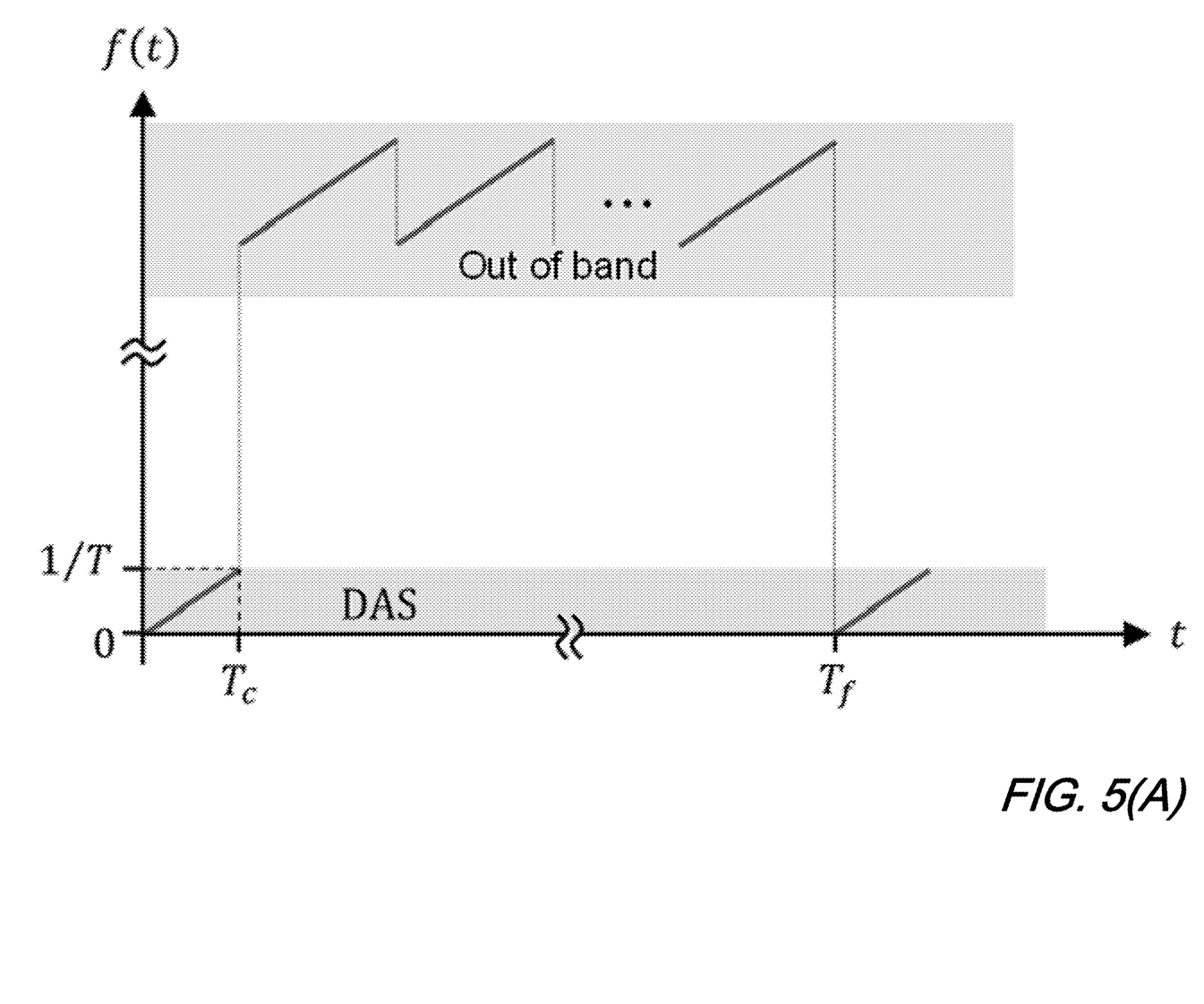
Figure 5B:
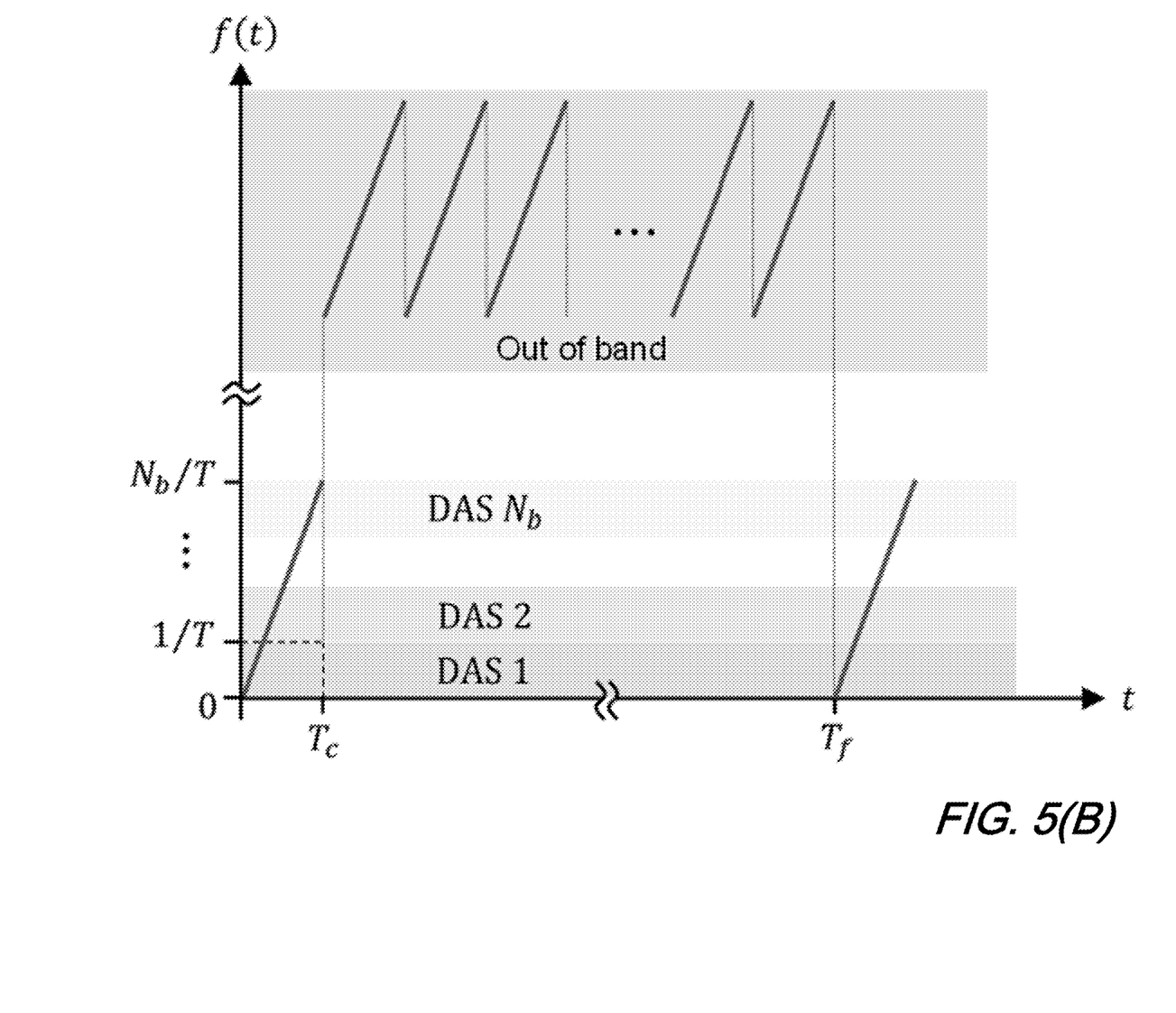

FIG. 5(A) and FIG. 5(B) are plots showing instantaneous frequency profile f(t) for: FIG. 5(A) TGD-OFDR frame; and FIG. 5(B) MB-DF-OFDR frame according to aspects of the present disclosure.

One way to retain the original spatial resolution is to increase the chirp rate by factor $N_b$, resulting in the interrogation signal having the instantaneous frequency profile shown in FIG. 5(B). For convenience of illustration, the origin of the time and frequency axes are shown shifted. The duration of the useful signal $T_c$ is less than the frame period $T_f$. To make the transmitted signal have constant envelope, therefore avoiding issues with amplifier gain transients, the rest of the frame is filled with out-of-band chirp, resulting in the transmission of the following signal over each frame:

$$x(t)=\sqrt{P}\exp(j2\pi\int_0^t f(t')dt'), \text{ for } 0 \leq t < T_f \quad (14)$$

Since for $T_c \leq t < T_f$ in each frame, the instantaneous frequency f(t) is outside the bandwidth of the receiver, the out-of-band chirp does not impact signal processing on the received signal. By chirping at an increased rate of $N_b\alpha$, the bandwidth covered by the truncated chirped pulse $x_{tr}(t)$ is restored to $\alpha T_c=1/T$, hence spatial resolution is restored to $(c/2n_{eff})$T. Furthermore, as the duration of $x_{tr}(t)$ is $T_c/N_b$, while the noise associated with $x_{tr}^*(t)*(y(t)\exp(-j2\pi f_b t))$ covers a bandwidth of 1/T, the SNR of each channel estimate $\hat{g}_b(t)$ is $1/N_b$ times that of conventional TGD-OFDR. After combining interferometric products from $N_b$ tributaries, each with independent noises, the rotated sum vector $\zeta(t)$ will have the same SNR as conventional TGD-OFDR.

One drawback with the MB-DF-OFDR approach is that the coherent receiver optics and ADCs needs to have sufficient bandwidth to have $N_b$ the bandwidth to recover all $N_b$ bands. There are also $N_b$ tributaries to process, which increases DSP complexity. However, the increase in DSP complexity is less than linear since each $x_b^*(t)$ has shorter duration, and the downstream processing after obtaining $\zeta(t)$ is the same as conventional TGD-OFDR.

As noted previously, our multiband DF-OFDR scheme uses the same physical hardware as conventional TGD-OFDR and is shown in FIG. 1. A low-linewidth continuous-wave (CW) laser is modulated with x(t) using any standard method such as an arbitrary waveform generator (AWG) driving a Mach-Zehnder I/Q Modulator. The modulated signal is amplified to the correct power level and is launched into the FUT through a circulator. The Rayleigh backscatter is received on the third port of the circulator, which is amplified and filtered, before coherent detection using the same CW laser which generated the outbound interrogation signal as the local oscillator (LO). We assume a standard coherent receiver front-end comprising a dual-polarization 90° optical hybrid followed by balanced photodetectors (BPD), followed by anti-aliasing filtering to reject out-of-band chirp, followed by sampling and digitization by analog-to-digital converters (ADC). The ADC sampling rate $T_{adc}$ should be sufficient to recover all $N_b$ frequency bands in FIG. 5(A) without aliasing.

Figure 6:
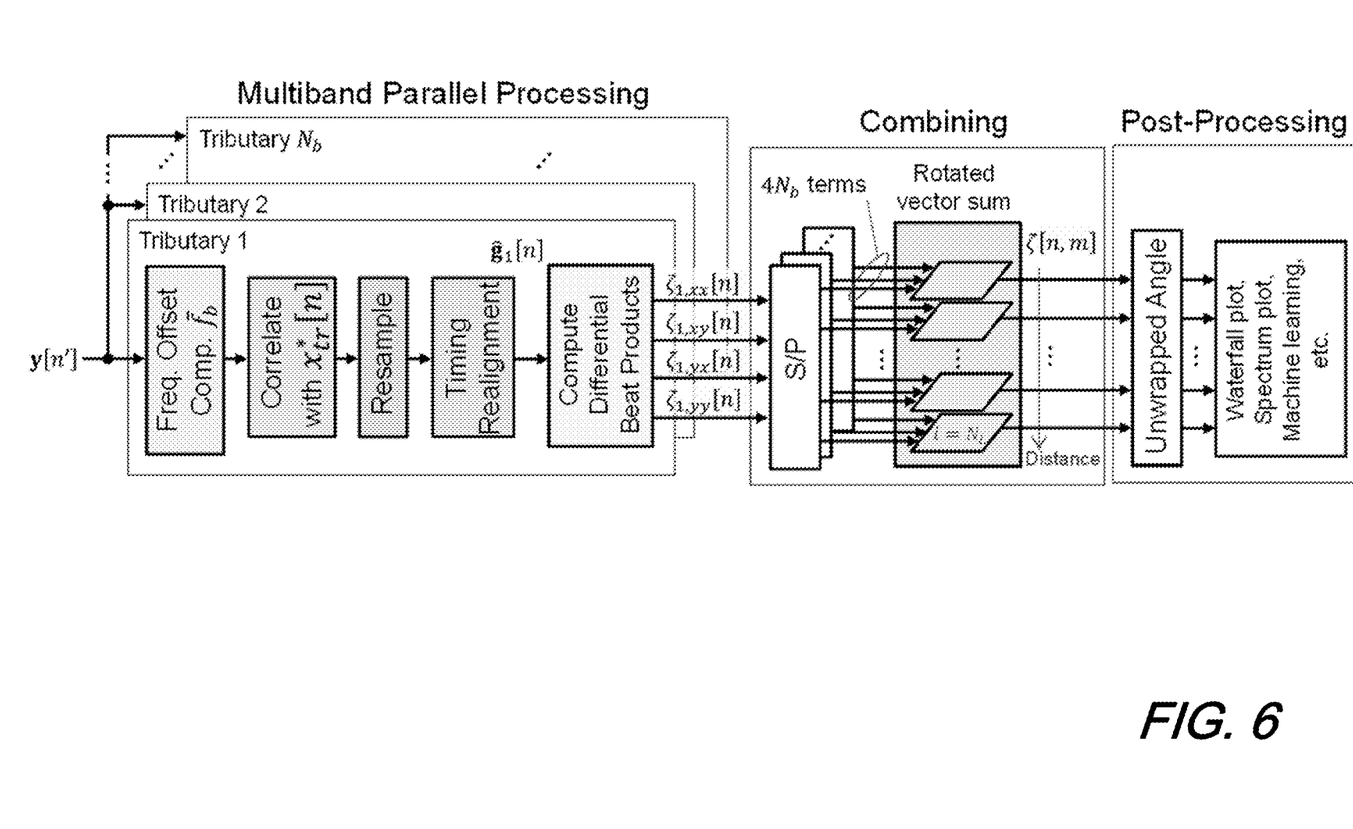
FIG. 6 shows a schematic diagram of an illustrative DSP architecture for MB-DF-OFDR according to aspects of the present disclosure.

FIG. 6 shows a schematic diagram of an illustrative DSP architecture for MB-DF-OFDR according to aspects of the present disclosure. With reference to that figure, we note that the digitized waveform $y[n'] \triangleq y(n'T_{adc})$ recovered from the coherent receiver is processed in $N_b$ parallel tributaries.

In tributary b, the received signal is first frequency downshifted by $\bar{f}_b$ followed by correlation with $x_{tr}^*[n'] \triangleq x_{tr}^*(n'T_{adc})$ to recover the estimated $\hat{g}_b[n']$–the Rayleigh impulse response for frequency band $f_b$. As $\hat{g}_b[n']$ only has bandwidth $1/N_bT$, it is downsampled to a lower rate of $1/T_s$, followed by timing realignment by $-n_b=-\tau_b/T_s$ samples for each subband.

As the interrogator transmits the chirped sequence $\Sigma_{m=-\infty}^{+\infty} x(t-mT_f)$ at a frame rate of $T_f=N_fT_s$, the correlation receiver output is periodic—i.e., $$\hat{g}_b[n+mN_f] \approx \frac{v_g}{2} h_b\left(\frac{v_g}{2} nT_s\right)$$

is an estimator of the Rayleigh impulse response for frequency band $f_b$ at fiber position $$\frac{v_g}{2} nT_s$$

during the transmission of the m-th frame. Interferometric products at a pre-determined gauge length of $\Delta z_g = (v_g/2)\Delta nT_s$ are then computed for the four combinations of polarizations $(k, l) \in \{x, y\}$:

$$\zeta_{b,kl}[n] = \hat{g}_{b,k}[n+\Delta n]\hat{g}_{b,l}^*[n]. \quad (15)$$

The $4N_b$ time-aligned interferometric products are combined into a rotated sum vector $\zeta[n]$. One method to accomplish this is to first parallelize $\zeta_{b,kl}[n]$:

$$\zeta_{b,kl}^p[n,m] \triangleq \zeta_{b,kl}[n+mN_f] \quad (16)$$

where n and m are the distance index and frame index, respectively. At each distance index n, the strongest interferometric product is selected:

$$(b_n, k_n, l_n) = \max_{b,k,l}\left\{\sum_m |\zeta_{b,kl}^p[n,m]|^2\right\} \quad (17)$$

The angle of all the other interferometric products relative to $\zeta_{b_n,k_n,l_n}^p$ are computed via an inner product, followed by a rotated vector sum operation to obtain $\zeta[n,m]$:

$$\phi_{b,kl,n} = \angle\left(\sum_m \zeta_{b,kl}^p[n,m](\zeta_{b_n,k_n,l_n}^p[n,m])^*\right) \quad (18)$$

$$\zeta[n,m] = \sum_{b=1}^{N_b} \sum_{(k,l)\in\{x,y\}} \zeta_{b,kl}^p[n,m]e^{-j\phi_{b,kl,n}} \quad (19)$$

The unwrapped phase over index m of $\zeta[n, m]$ is the cumulative time-varying longitudinal strain between fiber positions $(v_g/2)nT_s$ and $(v_g/2)(n+\Delta n)T_s$, at the time that the m-th frame was transmitted. Further processing of $\zeta[n, m]$ may include taking the fast Fourier transform over the time index m to reveal the frequency content of the vibration at every fiber position. A neural network operating on $\zeta[n, m]$ may also be used to classify the vibration event at every fiber position.

Figure 7A:
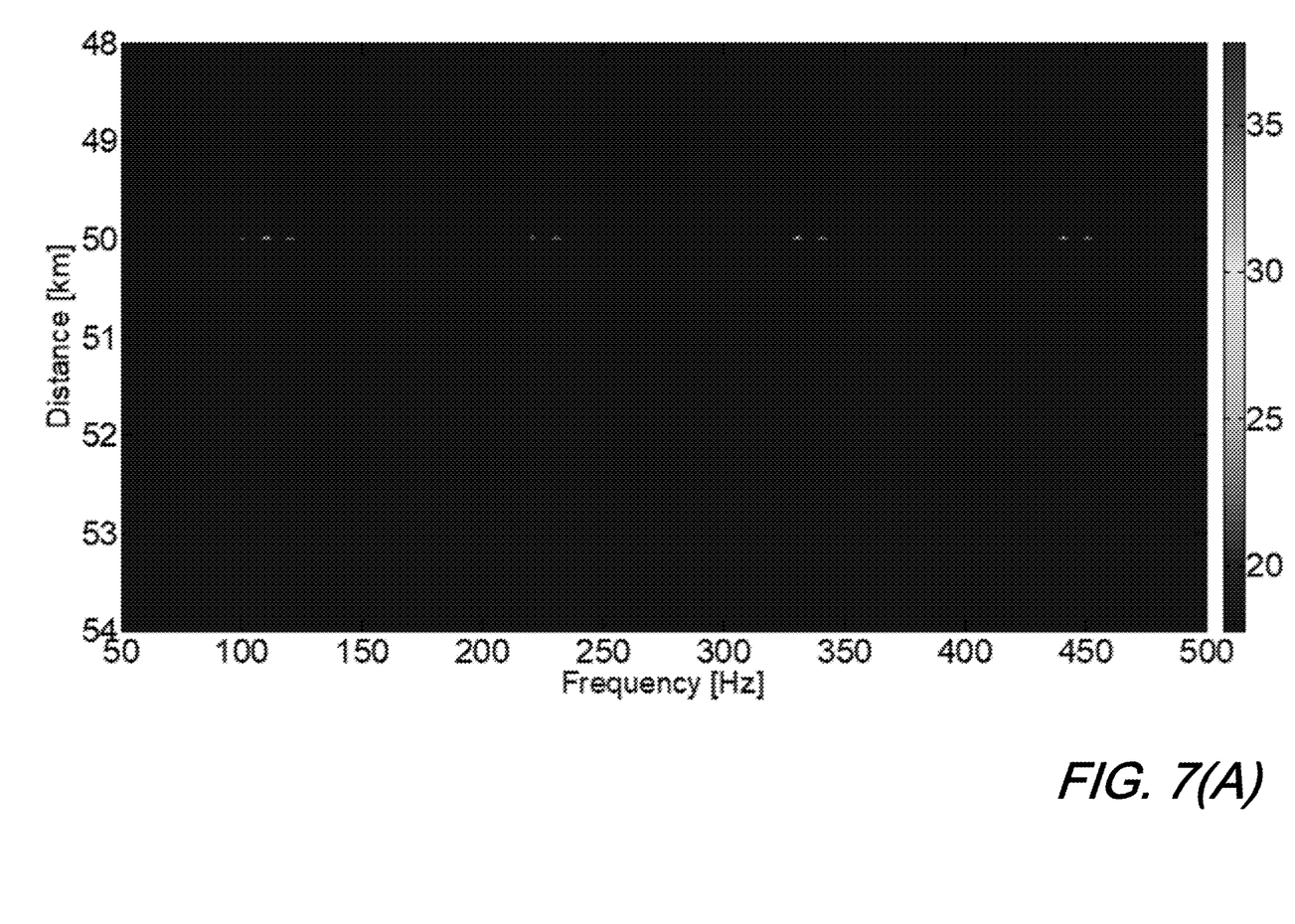
FIG. 7(A) is of measured vibration spectrum versus distance.
Figure 7B:
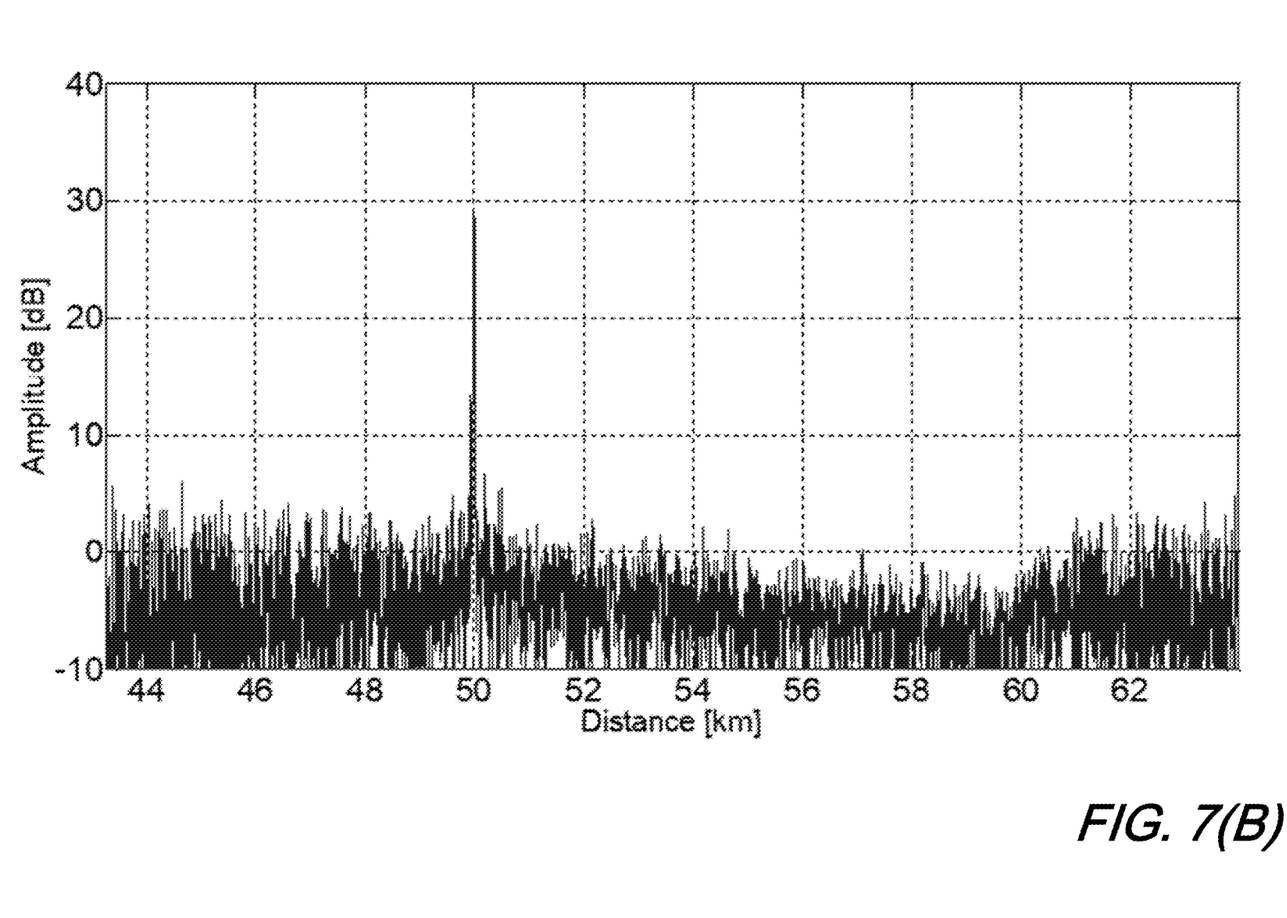
FIG. 7(B) is of vibration power vs distance at 110 Hz, according to aspects of the present disclosure.

FIG. 7(A) and FIG. 7(B) are plots showing DAS output obtained in a five-band MP-DF-OFDR experiment, showing improvement over TGD-OFDR wherein: FIG. 7(A) is of measured vibration spectrum versus distance; and FIG. 7(B) is of vibration power vs distance at 110 Hz, according to aspects of the present disclosure.

To illustrate the superior performance of the multiband DF-OFDR (MB-DF-OFDR) method, FIG. 7(A) and FIG. 7(B) show the same experiment as that of FIG. 3(A) and FIG. 3(B), using a $N_b=5$ band implementation of MB-DF-OFDR. The truncated chirped pulse $x_{tr}(t)$ has duration $T_c/N_b=10$ μs and sweeps over a bandwidth of $1/N_bT=10$ MHz.

The total bandwidth of $x(t)$ is thus 50 MHz, compared to 10 MHz for conventional TGD-OFDR in FIG. 3(A) and FIG. 3(B). It is observed that spatial leakage has been drastically reduced, as evidenced by the lack of a tail after the PZT at 50 km. Defining signal-to-interference ratio (SINR) to be the power difference between the peak at 50 km versus the average power after 50 km in FIG. 7(A) and FIG. 7(B), MB-DF-OFDR achieved an SINR of 34 dB, compared with 18 dB for conventional TGD-OFDR.

At this point, while we have presented this disclosure using some specific examples, those skilled in the art will recognize that our teachings are not so limited. Accordingly, this disclosure should be only limited by the scope of the claims attached hereto.

The invention claimed is:

1. A distributed acoustic sensing (DTS) system comprising:
   a length of optical sensing fiber under test (FUT); and
   an optical pulse generator optically coupled to the FUT, said optical pulse generator configured to generate and inject into the FUT chirped optical pulses of selectable duration and bandwidth at a frame rate limited by a round-trip propagation time of the pulses in the FUT; and
   a coherent receiver optically coupled to the FUT, said coherent receiver configured to detect Rayleigh backscatter signals from the FUT produced in the FUT in response to the injected chirped pulses injected therein.

2. The system of claim 1 further comprising a processor configured to determine acoustic vibrations affecting the FUT from the received Rayleigh backscatter signals.

3. The system of claim 2 wherein the coherent receiver includes an optical hybrid, followed by balanced photodetectors, one or more bandpass filters and one or more analog to digital converters.

4. The system of claim 3 further comprising a plurality of correlation receivers, wherein the plurality of correlation receivers receives as input, an output of the coherent receiver that is generated by the coherent receiver in response to the Rayleigh backscatter signal(s).

5. The system of claim 4 wherein the number of correlation receivers that comprise the plurality of correlation receivers is selectable and not dependent on the chirped signal produced by the optical pulse generator.

6. The system of claim 5 wherein the received Rayleigh backscatter signal(s) comprise a plurality of subbands and each individual one correlation receiver of the plurality of correlation receivers processes a different subband of the received Rayleigh backscatter signal(s).

7. The system of claim 1 wherein the processor is configured to perform a parallel fragmented multiband process instead of processing chirped pulses as a single sequence such that a tributary correlates received signals with a truncated chirped pulse to obtain a Rayleigh impulse response over its frequency band.

8. The system of claim 7 wherein a number of fragmented tributaries used is independent of the chirped pulses generated such that the generator can always generate/transmit the same signal.

9. The system of claim 8 wherein the generator uses an arbitrary waveform generator to produce an electrical chirped signal which in turn drives a Mach-Zehnder I/Q modulator.

* * * * *